(12) United States Patent
Prasad et al.

(10) Patent No.: US 8,934,497 B1
(45) Date of Patent: *Jan. 13, 2015

(54) SYSTEMS AND METHODS FOR IMPLEMENTING NETWORK GATEWAY IN CATASTROPHE CONTEXT OR THE LIKE

(71) Applicant: United Services Automobile Association (USAA), San Antonio, TX (US)

(72) Inventors: Bharat Prasad, San Antonio, TX (US); Bradly J. Billman, San Antonio, TX (US); Charles L. Oakes, III, Boerne, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/723,402

(22) Filed: Dec. 21, 2012

Related U.S. Application Data

(60) Continuation of application No. 12/247,283, filed on Oct. 8, 2008, now Pat. No. 8,345,695, which is a division of application No. 12/140,824, filed on Jun. 17, 2008, now abandoned.

(51) Int. Cl.
*H04L 12/56* (2006.01)
*H04L 12/66* (2006.01)

(52) U.S. Cl.
CPC ...................... *H04L 12/66* (2013.01)
USPC ........................................ 370/401

(58) Field of Classification Search
CPC ... H04L 29/06; H04L 45/00; H04L 29/06027; H04L 12/66; H04L 47/10; H04L 29/1584; H04L 65/102; H04L 2012/5618; H04W 88/16
See application file for complete search history.

(56) References Cited

U.S. PATENT DOCUMENTS

| | | |
|---|---|---|
| 5,787,111 A | 7/1998 | Gilmore |
| 6,418,299 B1 | 7/2002 | Ramanathan |

(Continued)

OTHER PUBLICATIONS

Midkiff, Scott., et al. "Rapidly-Deployable Broadband Wireless Networks for Disaster and Emergency Response", Presented at the First IEEE Workshop on Disaster Recovery Networks (DIREN '02), Jun. 24, 2002, New York City, NY. Center for Wireless Communications, Virginia Polytechnic Institute and State University.10 pgs.

(Continued)

*Primary Examiner* — Yong Zhou
(74) *Attorney, Agent, or Firm* — Eric Sophir; Dentons US LLP

(57) ABSTRACT

A system has a plurality of communications devices within a geographic area. Each device is capable of communicating from within the geographic area with any other device proximate the device, and is also capable of communicating from within the geographic area with a communications service having access to an area external to the geographic area if such communications service is operational and available to the device. At least one of the devices is a gateway device that communicates from within the geographic area with the communications service, and at least some of the devices are non-gateway devices that communicate from within the geographic area with the gateway device. Each non-gateway device communicates from within the geographic area with the area external thereto by way of the gateway device and the communications service communicated with by the gateway device.

20 Claims, 5 Drawing Sheets

(56) References Cited

U.S. PATENT DOCUMENTS

| | | |
|---|---|---|
| 6,496,949 B1 | 12/2002 | Kanevsky et al. |
| 6,879,574 B2 | 4/2005 | Naghian et al. |
| 7,584,195 B2 | 9/2009 | Johnson et al. |
| 2002/0080750 A1 | 6/2002 | Belcea |
| 2005/0002354 A1* | 1/2005 | Kelly et al. .......... 370/329 |
| 2005/0041673 A1 | 2/2005 | Jiang et al. |
| 2005/0130668 A1* | 6/2005 | Cameron .......... 455/456.1 |
| 2006/0062209 A1* | 3/2006 | Riley .......... 370/352 |
| 2006/0109815 A1 | 5/2006 | Ozer et al. |
| 2006/0234678 A1 | 10/2006 | Juitt et al. |
| 2009/0154343 A1* | 6/2009 | Fitch et al. .......... 370/221 |

OTHER PUBLICATIONS

Donahoo, M., et al. "Emergency mobile wireless networks," IEEE Xplore, Cygnus Commun., Inc., Carlsbad, CA, USA. Retrieved from the Internet <URL: http://ieeexplore.ieee.org/xpl/absprintijsp?arnumber+1606030&page=FREE>. Copyright 2008 IEEE, 1 pg.

* cited by examiner

SYSTEMS AND METHODS FOR IMPLEMENTING NETWORK GATEWAY IN CATASTROPHE CONTEXT OR THE LIKE

CROSS-REFERENCE TO RELATED APPLICATION(S)

This application is related to U.S. patent application Ser. No. 12/247,283, filed Oct. 8, 2008, entitled "SYSTEMS AND METHODS FOR IMPLEMENTING NETWORK GATEWAY IN CATASTROPHE CONTEXT OR THE LIKE", now U.S. Pat. No. 8,345,695 and U.S. patent application Ser. No. 12/140,824, filed Jun. 17, 2008, entitled "SYSTEMS AND METHODS FOR IMPLEMENTING NETWORK GATEWAY IN CATASTROPHE CONTEXT OR THE LIKE", now abandoned, all of which are incorporated herein by reference in their entirety.

FIELD

The present disclosure is directed to systems and methods that implement a network gateway by which external communications may be achieved, especially in a situation where communications may be limited in a local area, such as for example during or following a catastrophe. More particularly, the present disclosure is directed to such systems and methods that employ such a network gateway within a network of communications devices resident in such local area, such that any of the communications devices can externally communicate from the local area during or following the catastrophe or the like.

BACKGROUND

As is known, when a catastrophe or other extreme situation strikes a particular geographic area, tremendous stress is placed on the resources of the area. The catastrophe or other extreme situation may be weather-related, such as an encounter with a hurricane or typhoon, tornado, severe storm, or the like; geology-related, such as a volcanic eruption, earthquake, tsunami, or the like; naturally induced, such as an avalanche, mudslide, landslide, or the like; structurally related, such as a building collapse or structure collapse; and/or a result of human activity, such as a bombing, an act of war, or the like; and so forth.

As a result of such a catastrophe or other extreme situation (hereinafter, 'catastrophe'), and as should be understood, water, electricity, communications, and/or other utility services may be disrupted, as may be transportation systems, infrastructure, governmental services, and/or other needed resources. Moreover, such disruptions to such needed resources can occur during the catastrophe and can extend for days, weeks, or even months and years thereafter. As may be appreciated, such disruptions to such needed resources are especially acutely felt, both because of the loss of the resources, and also because the resources are likely especially needed, particularly to recover from the catastrophe.

One type of resource of particular interest in connection with such a catastrophe is communications resources between the particular geographic area in which the catastrophe has struck and the external world away from such catastrophe area. As may be appreciated, such external communications is likely vitally necessary, both to request assistance from the external world away from the catastrophe area, and also to allow the external world to obtain status on the catastrophe area. For an example of the former, with such external communications, medical supplies and emergency building materials may be requested. For an example of the latter, with such external communications, recovery aid and equipment may be targeted to appropriate locations within the catastrophe area.

Of course, internal and external communications in the catastrophe area is likely disrupted and therefore limited as a result of the catastrophe. In particular, telephone lines may have been severed, and wireless communications towers may have been destroyed or disabled. Additionally, such communications relies on the availability of electricity, both to operate centralized equipment and also to operate client equipment, and such electricity may also be disrupted. Moreover, the demand for such communications may be high and yet such communications availability may be limited, with the result being that such communications where available may be jammed with attempts to establish communications connections. As a result, such communications resources though perhaps available on a limited basis may be effectively not available on a reliable basis.

Accordingly, a need exists for a system and method for taking advantage of what limited communications are available within a catastrophe area to communicate with the external world. In particular, a need exists for a system and method that allows one of a plurality of communications devices within the catastrophe area to act as a network gateway device when such one device achieves external communications, and that allows the gateway device to form a network with a plurality of other communications devices within the catastrophe area such that each other communications device in the network can achieve external communications by way of the network gateway device. More particularly, a need exists for such a system and method where any of the plurality of communications devices can be the gateway device for the network if an opportunity to do so arises.

SUMMARY

The aforementioned needs are satisfied at least in part by a system and method for communicating between a geographic area and an area external thereto when communications services normally available within the geographic area have been disrupted and are not reliably available. The system has a plurality of communications devices within the geographic area. Each device is capable of communicating from within the geographic area with any other device proximate the device, and is also capable of communicating from within the geographic area with a communications service having access to the area external to the geographic area if such communications service is operational and available to the device.

At least one of the devices is a gateway device that communicates from within the geographic area with the communications service having access to the area external to the geographic area, and at least some of the devices are non-gateway devices that communicate from within the geographic area with the gateway device. Each non-gateway device communicates from within the geographic area with the area external thereto by way of the gateway device and the communications service communicated with by the gateway device.

A central server may be associated with one of the devices. If so, each non-gateway device sends data therefrom to be delivered from within the geographic area to the area external thereto by way of the gateway device and the communications service communicated with by the gateway device. In particular, the sent data from each device is delivered firstly to the central server and stored thereat, and then is delivered secondly from the central server to the area external to the geographic area by way of the gateway device and the communications service communicated with by the gateway device when such gateway device and such communications service have capacity for such delivery.

Each device periodically attempts to establish communications from within the geographic area with a communications service having access to the area external to the geographic area if such communications service is operational and available to the device. If communications with the communications service are established, the device operates as a gateway device within the geographic area periodically sends an 'available' message to any other of the devices nearby regarding the availability of the gateway device, and directs all communications from the device to the communications service.

If communications with the communications service are not established, the device listens for and hearing an available message from any other of the devices nearby regarding the availability of such device as a linking device. Such a linking device is one of the gateway device and another device directly or indirectly in communications with the gateway device. Thereafter, the device establishes communications with the linking device, and directs all communications from the device to the linking device, and thereby communicates with the communications service by way of such linking device.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
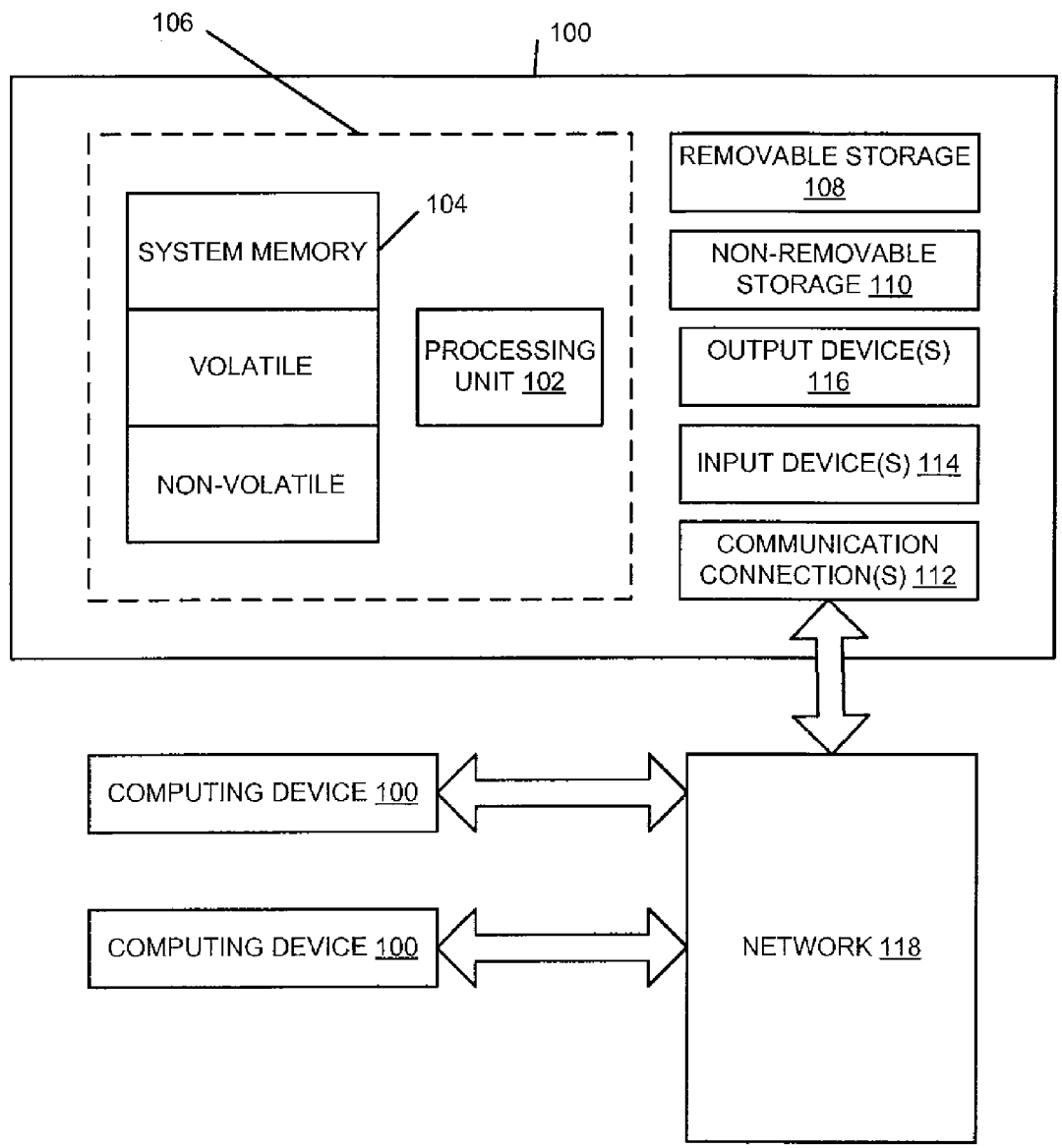
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RE), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Communications in Catastrophe Context or the Like

Figure 2:
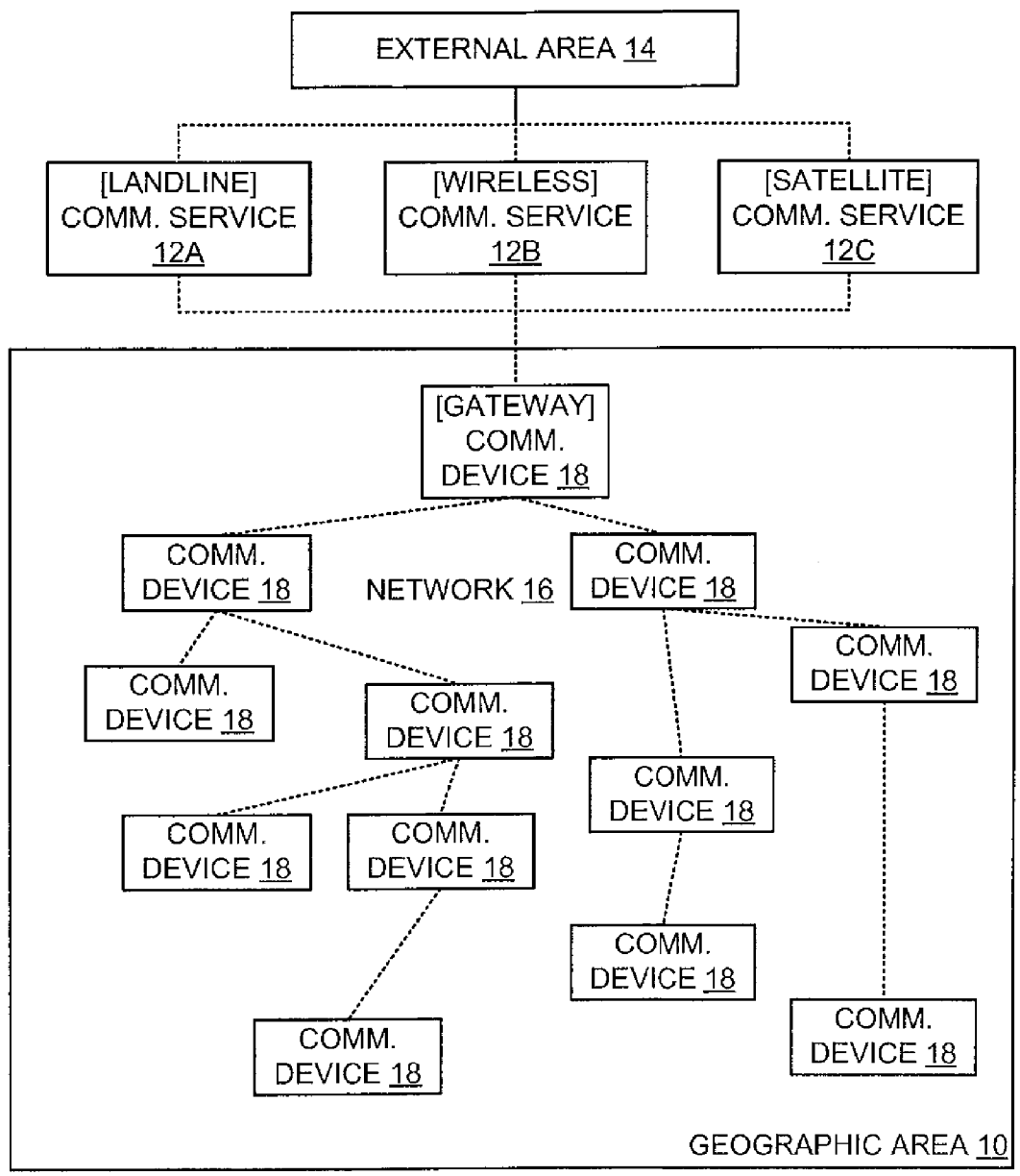
FIG. 2 is a block diagram of a system of devices that form a network within a geographic area, including at least one gateway device that communicates from within the geographic area with a communications service, and at least some non-gateway devices that communicate from within the geographic area with the gateway device in accordance with various embodiments of the present innovation.

Turning now to FIG. 2, it is seen that a catastrophe or other extreme situation (hereinafter, 'catastrophe') has struck a particular geographic area 10. Such geographic area 10 may be any particular area and may be of any particular size and defining characteristics without departing from the spirit and scope of the present innovation. For example, the geographic area 10 may be the size of a city block or a few city blocks, the size of a city, a county, or even a state, depending on particular circumstances. As was pointed out above, the catastrophe may be most any catastrophe, such as an encounter with a hurricane or typhoon, tornado, severe storm, or the like; a volcanic eruption, earthquake, tsunami, or the like; an avalanche, mudslide, landslide, or the like; a building collapse or structure collapse; a bombing, a gas explosion or other explosion, an act of war, or the like; and so forth.

As a result of such a catastrophe striking the geographic area 10, communications services 12a, 12b in particular are disrupted, as may be other services, systems, infrastructure, and/or other needed resources. Although such disruption can extend for days, weeks, or even months and years thereafter, it is to be appreciated that the length of the disruption is not particularly relevant to the present innovation except insofar as the length increases the need for restoration of such communications services 12a, 12b. As shown, such disrupted communications services 12a, 12b include a landline communications service 12a and a wireless (cellular) communications service 12b, although such disrupted communications services 12a, 12b may include other services without departing from the spirit and scope of the present innovation.

The manner of such disruption of such communications services 12a, 12b is not particularly relevant to the present innovation except insofar as such manner increases the need for such innovation. Nevertheless, examples of such disruption may include individual telephone lines, trunk lines, and long distance lines being severed, central offices and mobile switching centers being damaged or destroyed, loss of power to operate such central offices and mobile switching centers, as well as relay sites, cell tower sites, and the like, wireless transmission systems such as microwave transmitters and repeaters being damaged or destroyed, and/or the like. Moreover, even if such communications services 12a, 12b are at least partially operable, the demand for such communications services 12a, 12b is likely especially high, with the result being that such communications services 12a, 12b where available may be jammed or over-loaded with attempts to establish communications connections. As a result, such communications services 12a, 12b are only available on a limited basis if at all, and effectively are not available on a reliable basis.

With regard to such disrupted communication services 12a, 12b, it is to be appreciated that such services 12a, 12b can provide internal communications within the geographic area 10 and also external communications between the geographic area 10 and external areas 14. As may be appreciated, the present innovation is especially concerned with external communications between the geographic area 10 and external areas 14, although internal communications within the geographic area 10 may also be of importance, too. As was set forth above, such external communications is likely vitally necessary, both to request assistance from the external areas 14 away from the geographic area 10 that has been struck by the catastrophe, and also to allow the external areas 14 to obtain status on the geographic area 10.

Networked Communications Via Gateway Device

Accordingly, and in various embodiments of the present innovation, in a situation where communications and external communications within a geographic area 10 are disrupted due to a catastrophe, such communications and external communications in particular within the geographic area 10 are established for a network 16 of communications devices 18 resident in such geographic area 10. As seen in FIG. 2, in such network 16 of communications devices 18, each devices 18 can communicate directly with at least some other devices 18 in the network 16, at least insofar as the device 18 is proximate such other devices 18 or is directly coupled to such other devices 18.

Also, each device 18 can establish external communications by way of a communications service 12a, 12b if in fact such communications service 12a, 12b is operational and available in the vicinity of the device 18, or perhaps by way of another communications service 12c. As may be appreciated, such another communications service 12c may be a satellite service, a dedicated external service, or the like. Thus, if the device 18 has established such external communications, such device 18 acts as a gateway to external communications for all other devices 18 in the network 16. Note here that the network 16 may have therein as many gateway devices 18 as are available.

Figure 3:
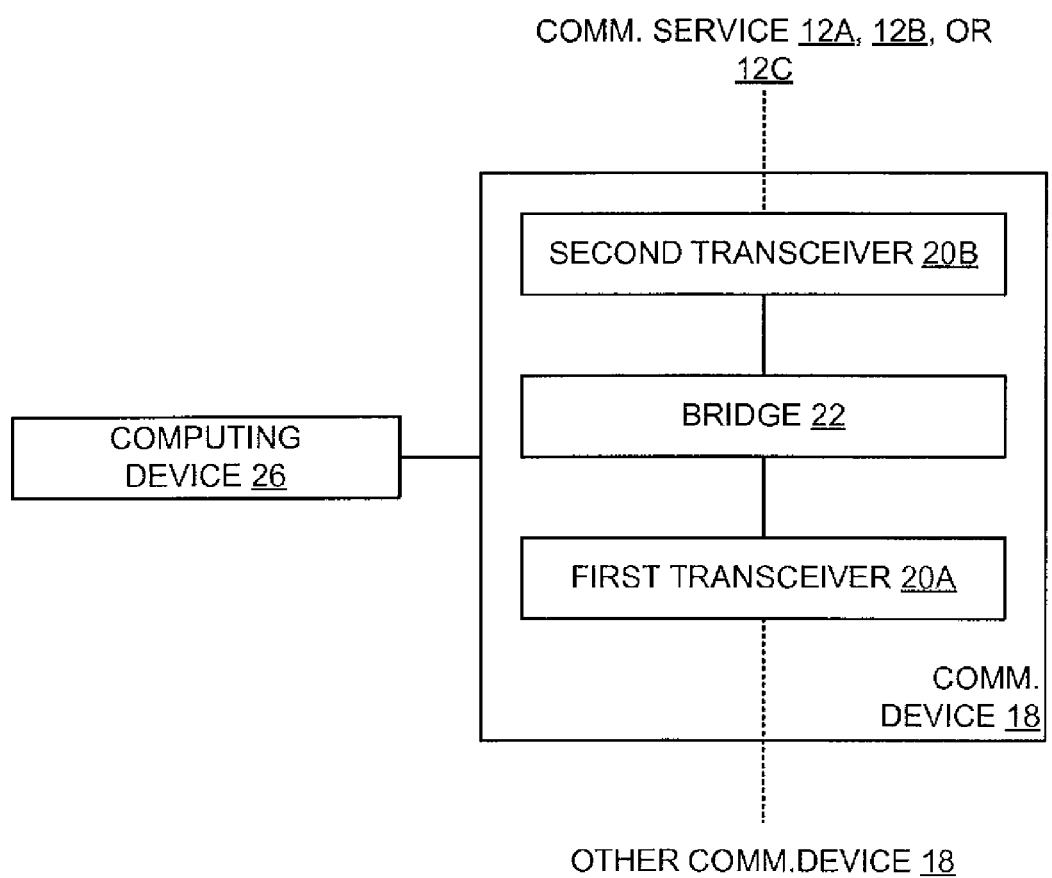
FIG. 3 is a block diagram of one of the devices of FIG. 2 in accordance with various embodiments of the present innovation.

Turning now to FIG. 3, it is seen that each device 18 includes a first, direct communications transceiver 20a by which the device 18 can directly communicate with other devices 18, and also a second, gateway communications transceiver 20b by which the device 18 can communicatively couple to the communications services 12a, 12b, and/or 12c in the event the device 18 is acting as a gateway. Additionally, each device 18 also includes a bridge 22 communicatively linking the first and second transceivers 20a, 20b in the event the device 18 is acting as a gateway.

In the aforementioned catastrophe context it is envisioned that mobility is highly valued, and accordingly the first and second transceivers 20a, 20b are both wireless transceivers, radios, or the like. However, in at least some instances the first and/or second communications transceivers 20a, 20b may operate over communications wires, cables, or other hard links without departing from the spirit and scope of the present innovation.

That said, each of the first and second transceivers 20a, 20b may be most any appropriate transceivers system, based of course on the particular communications required of each of such first and second transceivers 20a, 20b. For example, the second transceiver 20b by which a device 18 acting as a gateway communicates with a communications service 12a, 12b, and/or 12c is likely a transceiver 20b tailored for one or more of such communications services 12a, 12b, 12c, such as a landline transceiver if a landline service 12a, a cellular transceiver if a wireless service 12b, and/or a satellite transceiver if a satellite service 12c. Additionally, such first communications system 20a may include or be associated with encryption and decryption functionality if necessary and/or desirable, and may also include or be associated with communications-establishing functionality as necessary or appropriate to initiate communications within a service 12a, 12b, and/or 12c.

Likewise, the first transceiver 20a by which devices 18 communicate with each other may be a field radio such as a local citizens band radio, a UHF radio, a VHF radio, a police or railroad or air radio, or the like, may be a digital radio or the like, may be a landline transceiver, etc. Additionally, such first transceiver 20a may include or be associated with encryption and decryption functionality if necessary and/or desirable, and may also include or be associated with network policing functionality 24 to limit the network 16 only to a select set of the devices 18.

Such network policing functionality 24 is known or should be apparent to the relevant public and therefore need not be set forth herein in any detail other than that which is provided. Essentially, such network policing functionality 24 in a device 18 involves some sort of handshaking and registration between devices 18, and allows such device 18 to communicate with other devices 18 and vice versa only if such other device 18 can be authenticated as being within the network 16, such as for example by having a particular ID, employing a particular network call sign, employing a particular password, etc. As may be appreciated, then, use of such network policing functionality 24 allows the network 16 to be limited to a select group of individuals having the aforementioned select set of the devices 18, such as for example a set of public safety officers, a set of firefighters, a set of repair workers for a particular organization, etc.

In one particular example of a select group of individuals, and in various embodiments of the present innovation, an insurance company insuring a number of properties within the geographic area 10 may send in a team of adjusters in an effort to help owners of such properties in their attempts to claim insurance losses. In such a case, each adjuster in the team may be supplied with a communications device 18. In doing so, then, such adjusters would spread out over the geographic area and in doing so would establish a network 16 therebetween by way of such devices 18. Moreover, in spreading out, at least some of the devices 18 of the adjusters would establish external communications and would act as gateways for the other devices 18 in the network 16.

Note here that in the case of the adjusters, the communications devices 18 could be audio communications devices 18 to allow the adjusters to orally communicate both amongst each other by way of the network 16, and also with other individuals by way of the network 16, a gateway device 18, and appropriate external communications established thereby. In addition or on the alternative, the communications devices 18 could be data communications devices 18 to allow the adjusters to send and receive data, such as for example data regarding adjustment reports and other similar communications that would be sent to and received from the insurance company. In such a case, each communications device 18 could be appropriately coupled to a computing device 26 (FIG. 3) of the respective adjuster with such data, or the communications device 18 could be included with the computing device 26.

Figure 4:
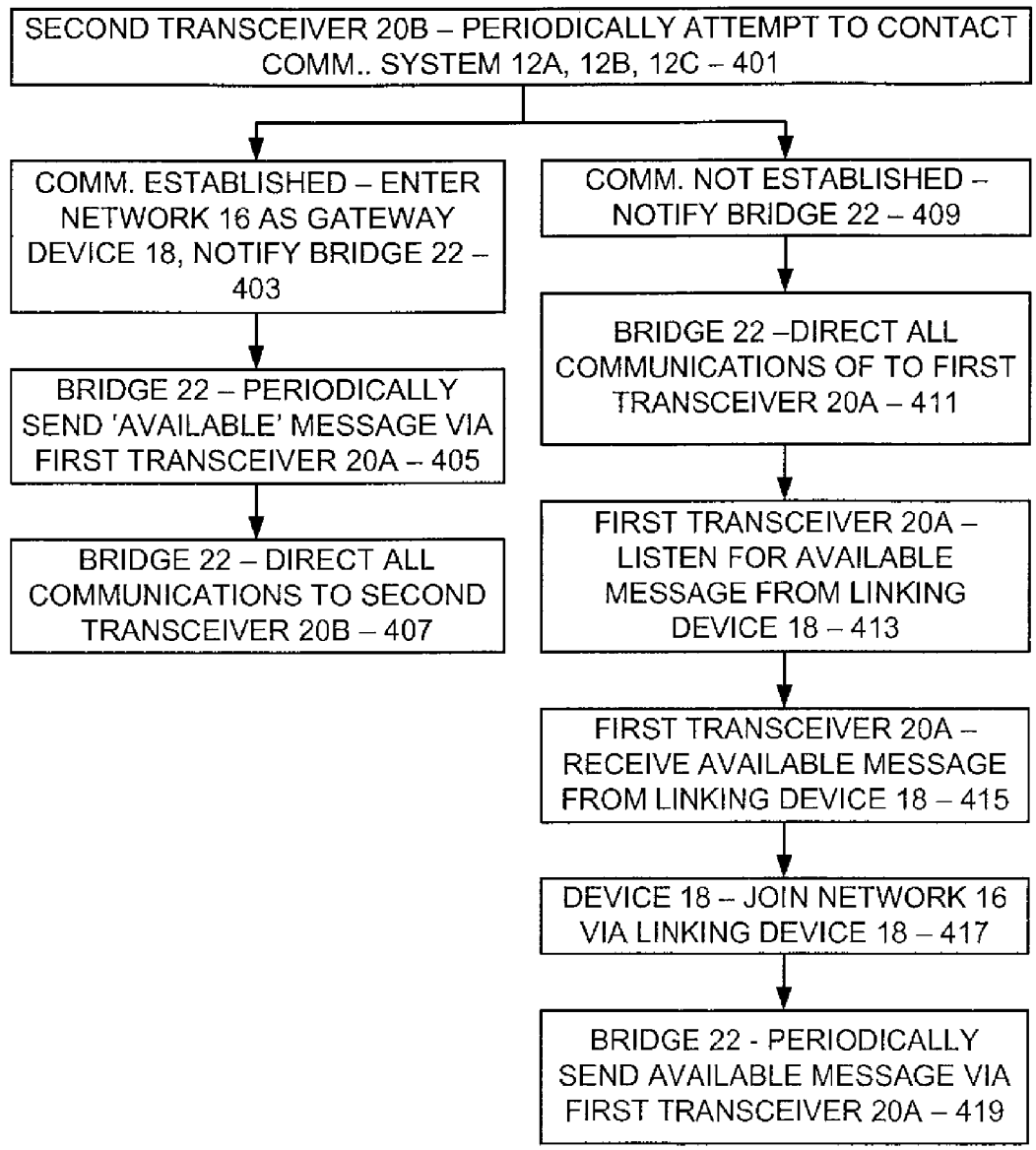
FIG. 4 is a flow diagram showing actions performed by a device of the system of FIG. 2 in accordance with various embodiments of the present innovation.

Turning now to FIG. 4, it is seen that regardless of the group of individuals that are employing the network 16 of devices 18, each device 18 enters the network 16 in the following manner. Preliminarily, the entering device 18 is powered on and thereafter the second transceiver 20b of such entering device 18 periodically attempts to establish communications with one or more of the communications services 12a, 12b, and/or 12c (401). If so, the entering device 18 may be employed within the network 16 as a gateway device 18. Accordingly, the second transceiver 20b of the entering device 18 notifies the bridge 22 thereof regarding such established communications and such availability as a gateway device 18 (403), and the bridge 22 then periodically sends an 'available' message by way of the first transceiver 20a of the entering device 18 to any other devices 18 nearby regarding the availability of the gateway device 18 (405). Additionally, the bridge 22 directs all communications with regard to the entering device 18 itself to employ the second transceiver 20b (407).

However, if the second transceiver 20b of the entering device 18 cannot establish communications with one or more of the communications services 12a, 12b, and/or 12c, then such second transceiver 20b notifies the bridge 22 of the entering device 18 regarding such lack of established communications and corresponding lack of availability as a gateway device 18 (409). Based thereon, the bridge 22 of the entering device 18 directs all communications with regard to the entering device 18 itself to employ the first transceiver 20a, presuming that the first transceiver 20a establishes communications within the network 16 with another device 18 as a gateway device 18 (411).

In particular, to establish such communications, the bridge 22 of the entering device 18 directs the first transceiver 20a thereof to listen for an available message from any other linking device 18 nearby that is already joined to the network 16, either as a gateway device 18 or a non-gateway device 18 (413) In various embodiments of the present innovation, the first transceiver 20a of the entering device 18 receives such an available message from such a linking device 18, either as a gateway device 18 or a non-gateway device 18 (415) and based thereon, the entering device 18 joins the network 16 (417). As such, and within the network 16, the now-entered device 18 communicates with a communications service 12a, 12b, or 12c by way of such linking device 18.

In particular, the entered device 18 transmits information to the linking device 18, which if not a gateway device 18 forwards same toward such a gateway device 18 and then the communications service 12a, 12b, or 12c. Likewise, the entered device 18 receives information from the linking device 18, which again if not a gateway device 18 was forwarded thereto and originated from the communications service 12a, 12b, or 12c by way of such a gateway device 18. As may be appreciated, then, if the linking device 18 is a non-gateway device 18, such non-gateway linking device 18 is in communications with such a gateway device 18, either directly or indirectly via one or more intermediary non-gateway devices 18. Thus, it may be that a 'daisy chain' of devices 18 may form between a gateway device 18 and an entering device 18 seeking entry into the network 16, where the daisy chain extends an indeterminate length. More accurately, multiple devices 18 may branch from a gateway device 18 in the manner shown in FIG. 2.

Significantly, once the entering device 18 joins the network 16 based on an available message from a linking device 18, the entered device 18 itself periodically transmits such an available message by way of the first transceiver 20a thereof (419) so as to give other devices 18 an opportunity to join the network 16. Thus, the entered device 18 may itself become a link in a daisy chain for one or more other entered devices 18, or more accurately become a branch from the gateway device 18.

Note here that the bridge 22 may employ rules to determine how to enter the network 16 by way of a linking device 18. For example, one rule may be that if multiple linking devices 18 are available, entry should be made with the linking device that is in a shorter daisy chain to a gateway device 18. Note here that in order to do so, and in various embodiments of the present innovation, the available message from the linking device 18 specifies a number of links to such a gateway device 18. For another example, a rule may be that if multiple linking devices 18 are available, entry should be made with the linking device having the highest signal strength at the entering device 18. Here, and in various embodiments of the present innovation, the entering device 18 includes appropriate circuitry to measure such signal strength. Of course, any other appropriate rules may also be employed.

Note too that first transceiver 20a of the entered device 18 may eventually lose communication with the linking device 18 thereof. In such a case the actions of FIG. 4 may be repeated, particularly from 409 onward. Also, the second transceiver 20b of the entered device 18 may eventually establish communications with one or more of the communications services 12a, 12b, and/or 12c as at 401, in which case the entered device 18 would then be employed within the network 16 as a gateway device 18 as at 403-407. As such, any other devices 18 branching from the entered device 18 would still do so, although the number of links between such branching devices 18 and a gateway would be shortened.

Using Central Server

Figure 5:
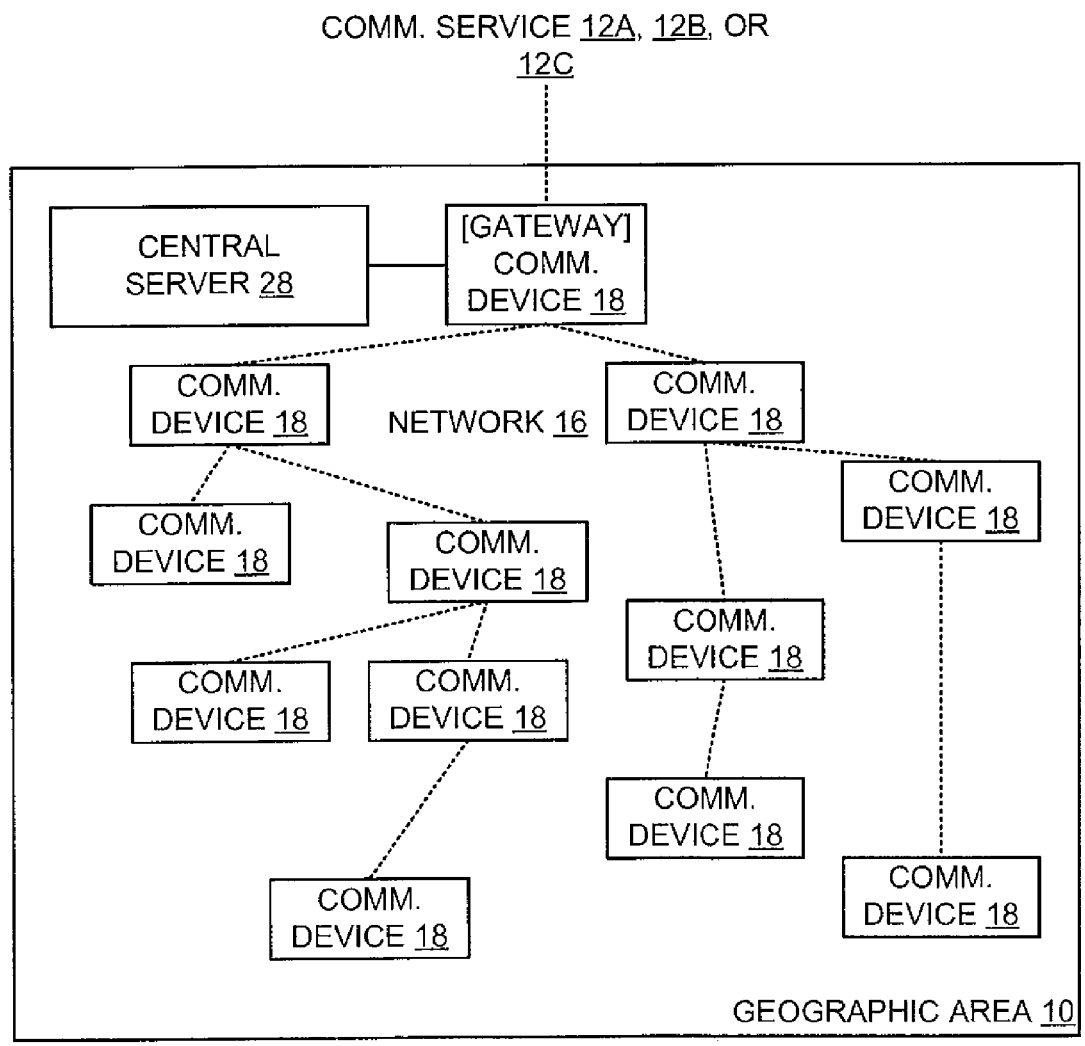
FIG. 5 is a block diagram similar to that of FIG. 2, but with a central server in accordance with various embodiments of the present innovation.

In various embodiments of the present innovation, and turning now to FIG. 5, a central server 28 is employed within a network 16 of devices 18 such as the network of FIG. 2. Here, and as should be appreciated, the central server 28 acts as a repository for all data transmitted from the devices 18 of the network 16, presuming that a gateway device 18 is not available for the network 16, or that such a gateway device 18 while available is over-worked or otherwise busy. Thus, in the aforementioned example where an insurance company insuring a number of properties within the geographic area 10 sends in a team of adjusters, each adjuster may develop data regarding claims and may be attempting to transmit such data to the insurance company, but for whatever reason the data cannot all be sent immediately. In such a case, the central server 28 would store such data until the data can be sent.

With such a central server 28, and as seen in FIG. 5, all communications would be funneled to the central server 28 and then from such central server 28 to an available gateway device 18. Thus, the central server 28 would itself be associated with a device 18 by which such central server 28 can enter the network 16. Note here that such central server 28 may indeed be central such that the device 18 thereof is a gateway device 18 and all other devices 18 branch therefrom, as is shown in FIG. 5. Alternately, the device 18 of such central server 28 may enter the network 16 like any other device 18 and thereby reside at a branch leading to a gateway device 18. In the former case, and as should be appreciated, all data is necessarily funneled to the central server 28 but the central server 28 must be located so as to easily allow the gateway device 18 thereof access to a communications service 12a, 12b, or 12c. In the latter case, and as should also be appreciated, data may be required to travel in both directions on the branch from which the device 18 of the central server 28 extends.

In either case, entry of each device 18 into the network 16 would be substantially as was set forth above in connection with FIG. 4, perhaps with minor alterations that by now should be apparent to the relevant public. Note, though, that special rules may apply to entry of the device 18 of the central server 28. For example, the device 18 if not a gateway device 18 may be limited to a particular maximum number of links from a gateway server 18.

Note too that with such a central server 28, rules regarding the formation of the network 16 may be stored at such central server 28, and may include additional details relevant to operating within a network 16 having such a central server 28. Additionally, such a central server 28 may be employed to maintain centralized information on the network 16, including all devices 18 therein, all gateway devices 18 therein, the number of links of each device 18 to a respective gateway device 18, etc. Accordingly, the information in such central server 28 may be employed to perform load balancing among the gateway devices 18 of the network 16, among other things.

CONCLUSION

Thus far, the various embodiments of the present innovation have been set forth primarily in terms of a network 16 established in the context of a catastrophe in a geographic area 10. However, and as should be appreciated, the network 16 may be established in any appropriate context of a geographic area 10. For example, the network 16 may be established during a festival in a remote location where normal communications services 12a, 12b are not resident, or the like.

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a system and method are provided to take advantage of what limited communications are available within a particular geographic area 10, such as for example during and after a catastrophe has struck such area 10, so as to allow communication with the external world. One or more of a plurality of communications devices 18 within the area 10 act as a network gateway device 18 when such device 18 achieves external communications, and a network 16 forms so that a plurality of other communications devices 18 within the area 10 branch from the gateway device 18 such that each other communications device 18 in the network 16 can achieve external communications by way of the network gateway device 18. Any of the plurality of communications devices 18 can be a gateway device 18 for the network 16 if an opportunity to do so arises.

It should be appreciated that changes could be made to the embodiments described above without departing from the innovative concepts thereof. For example although each device 18 is disclosed as having first and second transceivers 20a, 20b for performing dual transceiving functions, such dual functions may alternately be performed by a single transceiver if such a transceiver is capable of performing such dual functions. It should be understood, therefore, that this innovation is not limited to the particular embodiments disclosed, but it is intended to cover modifications within the spirit and scope of the present innovation as defined by the appended claims.

The invention claimed is:

1. A non-transitory computer-readable storage medium comprising
instructions executable by a processor to:
allow each of a plurality of devices of a network to communicate within a geographic area with other devices within the geographic area, each device also being capable of communicating from within the geographic area to another geographic area, external to the geographic area, using an available communications service having access to the other geographic area, wherein each device includes network policing functionality allowing the device to communicate with another device responsive to an authentication of the other device as being within the network;
allow access to the other geographic area via a primary gateway device, wherein the primary gateway device is configured to periodically send a message associated with an availability of the primary gateway device to at least one of the plurality of the devices of the network;
allow at least one of the devices to become a secondary gateway device when a signal from the primary gateway communication has been lost, wherein the secondary gateway device communicates from within the geographic area to the other geographic area;
allow at least some of the devices to become non-gateway devices that communicate from within the geographic area with the secondary gateway device; and
allow the non-gateway devices to send data from the geographic area to the other geographic area via the secondary gateway device using the communications service.

2. The medium of claim 1, wherein each of at least some of the devices within the geographic area is allowed to communicate from within the geographic area with the secondary gateway device, such communication being one of directly with the gateway device and indirectly with the secondary gateway device by way of at least one other device.

3. The medium of claim 1, wherein each device includes the network policing functionality performs performing handshaking and registration between devices, such network policing functionality allowing and allows the device to communicate with another device only if such another the other device can be authenticated to the device.

4. The medium of claim 1, wherein an entry of a device into the network includes the entering device:
measuring a signal strength of a number of other devices of the network; and
transmitting an available message via a transceiver associated with the entering device subsequent to the entry of the entering device.

5. The medium of claim 1, wherein the instructions executable to allow the non-gateway devices to send data from the geographic area to the other geographic area via the second gateway device using the communications service include instructions to:
deliver the data from each device to a central server; and
deliver the data from the central server to the other geographic area, wherein the central server acts as a repository for all data awaiting delivery.

6. The medium of claim 1, wherein the instructions executable to allow the non-gateway devices to send data from the geographic area to the other geographic area via the second gateway device using the communications service include instructions to:
deliver the data from each device to a central server; and
deliver the data from the central server to the other geographic area, wherein the central server is associated with one of a gateway device and a non-gateway device.

7. The medium of claim 1, wherein the instructions executable to allow the non-gateway devices to send data from the geographic area to the other geographic area via the second gateway device using the communications service include instructions to:
deliver the data from each device to a central server; and
deliver the data from the central server to the other geographic area, wherein the central server stores rules regarding formation of the network.

8. A non-transitory computer-readable storage medium comprising instructions executable by a processor to:
allow each of a plurality of devices of a network to communicate within a first geographic area with other devices in the first geographic area, each device also being capable of communicating from within the first geographic area to a second geographic area, external to the first geographic area, using an available communications service, wherein each device includes network policing functionality allowing the device to communicate with another device responsive to an authentication of the other device as being within the network;

allow access to the second geographic area via a primary gateway device when communications are not disrupted;

allow at least one of the devices to become a secondary gateway device when a signal from the primary gateway communication has been lost, wherein the secondary gateway device communicates from within the first geographic area to the second geographic area;

allow at least some of the devices to become non-gateway devices that communicate from within the first geographic area with the secondary gateway device; and allow each non-gateway device to send data from the first geographic area to the second geographic area via the secondary gateway device using the communications service.

9. The medium of claim 8, wherein each of at least some of the devices within the first geographic area is allowed to communicate from within the first geographic area with the secondary gateway device, such communication being one of directly with the gateway device and indirectly with the secondary gateway device by way of at least one other device.

10. The medium of claim 8, wherein each device includes a direct communications transceiver by which the device can directly communicate with other devices, a gateway communications transceiver by which the device can communicatively couple to a communications service, and a bridge communicatively linking the first and second transceivers when the device is a gateway device.

11. The medium of claim 10, wherein the bridge determines how to enter the network based on a number of rules.

12. The medium of claim 10, wherein the bridge determines that a plurality of devices are available for communication indirectly with the secondary gateway device, and wherein the bridge determines that entry into the network should be made with a device having communication from within the first geographic area with the secondary gateway device by way of fewer devices of the network.

13. The medium of claim 10, wherein the bridge determines that a plurality of devices are available for communication indirectly with the secondary gateway device, and wherein the bridge determines that entry into the network should be made with a device having a particular signal strength.

14. The medium of claim 10, wherein the bridge determines that a plurality of devices are available for communication indirectly with the secondary gateway device, and wherein the bridge determines that entry into the network should be made with a device having a highest signal strength.

15. The medium of claim 8, wherein the instructions executable to allow each non-gateway device to send data from the first geographic area to the second geographic area via the second gateway device using the communications service include instructions to:

deliver the data from each device to a central server; and deliver the data from the central server to the second geographic area, wherein the central server stores rules regarding formation of the network.

16. A non-transitory computer-readable storage medium comprising instructions executable by a processor to:

allow each of a plurality of devices of a network to communicate within a first geographic area, with other devices proximate the device, each device also being capable of communicating from within the first geographic area to a second geographic area, external to the first geographic area, using an available communications service having access to the external second geographic area, wherein each device includes network policing functionality allowing the device to communicate with another device responsive to an authentication of the other device as being within the network;

associate a central server with one of the devices;

allow access to the second geographic area via a primary gateway device when communications are not disrupted;

allow at least one of the devices to become a secondary gateway device when a signal from the primary gateway communication has been lost, wherein the secondary gateway device communicates from within the first geographic area to the second geographic area; and allow each of a number of non-gateway devices to send from the first geographic area to the second geographic area via the secondary gateway device using the communications service, the sent data from each non-gateway device being delivered to the central server and stored thereat, and then being delivered from the central server to the second geographic area by way of the secondary gateway device and the communications service.

17. The medium of claim 16, wherein each of at least some of the devices within the first geographic area is allowed to communicate from within the first geographic area with the secondary gateway device, such communication being one of directly with the gateway device and indirectly with the secondary gateway device by way of at least one other device.

18. The medium of claim 16, wherein each device includes a first, direct communications transceiver by which the device can directly communicate with other devices, a second, gateway communications transceiver by which the device can communicatively couple to a communications service, and a bridge communicatively linking the first and second transceivers when the device is a gateway device.

19. The medium of claim 16, further comprising instructions executable to allow the central server to act as a repository for all data awaiting delivery.

20. The medium of claim 16, further comprising instructions to associate the central server with one of a gateway device and a non-gateway device.

* * * * *